US005644364A

United States Patent [19]
Kurtze et al.

[11] Patent Number: 5,644,364
[45] Date of Patent: Jul. 1, 1997

[54] MEDIA PIPELINE WITH MULTICHANNEL VIDEO PROCESSING AND PLAYBACK

[75] Inventors: Jeffrey Kurtze, Nashua, N.H.; Ray Cacciatore, Westford, Mass.; Peter Zawojski, Merrimack, N.H.; Eric C. Peters, Carlisle, Mass.; John Walsh, Jr., North Chelmsford, Mass.

[73] Assignee: Avid Technology, Inc., Tewksbury, Mass.

[21] Appl. No.: 347,394

[22] PCT Filed: Apr. 18, 1994

[86] PCT No.: PCT/US94/04253

§ 371 Date: Mar. 6, 1995

§ 102(e) Date: Mar. 6, 1995

[87] PCT Pub. No.: WO94/24815

PCT Pub. Date: Oct. 27, 1994

[30] Foreign Application Priority Data

Apr. 16, 1993 [GB] United Kingdom .................. 9307894

[51] Int. Cl.$^6$ .................................................. H04N 5/262
[52] U.S. Cl. ............................................ 348/584; 348/598
[58] Field of Search ................................... 348/595, 597, 348/584, 578, 590, 598, 601; H04N 9/74, 9/76, 5/262, 5/265

[56] References Cited

U.S. PATENT DOCUMENTS

| | | | |
|---|---|---|---|
| 2,927,154 | 3/1960 | Wolfe et al. ................. | 178/6.6 |
| 3,084,215 | 4/1963 | Bounsall .................... | 178/6.6 |
| 3,123,668 | 3/1964 | Silva ....................... | 178/6.8 |
| 3,342,949 | 9/1967 | Wessels ..................... | 179/100.2 |
| 3,721,757 | 3/1973 | Ettlinger ................... | 178/6.6 A |
| 3,740,463 | 6/1973 | Youngstrom et al. ........... | 178/6.6 A |
| 3,748,381 | 7/1973 | Strobele et al. ............. | 178/6.6 A |
| 3,787,617 | 1/1974 | Fiori ....................... | 179/100.2 |
| 3,824,336 | 7/1974 | Gould et al. ................ | 178/6.8 |
| 3,925,815 | 12/1975 | Lemelson ................... | 360/14 |
| 4,001,882 | 1/1977 | Fiori et al. ................ | 360/14 |
| 4,100,607 | 7/1978 | Skinner .................... | 364/900 |
| 4,272,790 | 6/1981 | Bates ...................... | 360/14 |
| 4,283,745 | 8/1981 | Kuper et al. ............... | 360/13 |
| 4,363,049 | 12/1982 | Ohtsuki et al. ............. | 360/13 |
| 4,375,083 | 2/1983 | Maxemchuk ................. | 364/900 |
| 4,602,286 | 7/1986 | Kellar et al. .............. | 358/183 |
| 4,698,682 | 10/1987 | Astle ...................... | 348/584 X |

(List continued on next page.)

FOREIGN PATENT DOCUMENTS 0 390 048  10/1990  European Pat. Off. .
0 469 850  1/1992   European Pat. Off. .

OTHER PUBLICATIONS

Davidoff, Frank, The All-Digital Television Studio, SMPTE Journal, vol. 89, No. 6, Jun. 1980, pp. 445–449.

Fox, E.A. et al., Virtual Video Editing in Interactive Multimedia Applications, Communications of the ACM, vol. 32, No. 7, Jul. 1989, pp. 802–810.

*Primary Examiner*—John K. Peng
*Assistant Examiner*—Nathan J. Flynn
*Attorney, Agent, or Firm*—Wolf, Greenfield & Sacks, P.C.

[57] ABSTRACT

The invention improves over the prior art by providing a media pipeline with two channels for processing sequences of digital still images. A blender is provided so as to enable simple effects on these two streams of video data such as dissolves, wipes and chroma keys. Complex arbitrary three-dimensional effects and other effects may also be provided using an external interface.

Thus, a system for processing sequences of digital still images to provide real-time digital video effects includes first and second channels for communicating first and second sequences of digital still images at a rate for simulating video. A controller directs still images to one of the first and second channels. A blender, having a first input connected to the first channel, a second input connected to the second channel, and an output, provides a combination of the first and second sequences of digital still images at a rate for simulating video.

16 Claims, 8 Drawing Sheets

U.S. PATENT DOCUMENTS

| | | | |
|---|---|---|---|
| 4,717,971 | 1/1988 | Sawyer | 358/342 |
| 4,746,994 | 5/1988 | Ettlinger | 360/13 |
| 4,750,050 | 6/1988 | Belmares-Sarabia et al. | 358/311 |
| 4,937,685 | 6/1990 | Barker et al. | 360/14 |
| 4,970,663 | 11/1990 | Bedell et al. | 364/521 |
| 4,979,050 | 12/1990 | Westland et al. | 360/14.1 |
| 5,045,940 | 9/1991 | Peters et al. | 348/7 |
| 5,121,210 | 6/1992 | Hirayama | 358/183 |
| 5,164,839 | 11/1992 | Lang | 358/335 |
| 5,189,516 | 2/1993 | Angell et al. | 358/181 |
| 5,192,999 | 3/1993 | Graczyk et al. | 358/85 |
| 5,206,929 | 4/1993 | Langford et al. | 395/159 |
| 5,227,863 | 7/1993 | Bilbrey et al. | 358/22 |
| 5,237,648 | 8/1993 | Mills et al. | 395/133 |
| 5,241,389 | 8/1993 | Bilbrey | 358/181 |
| 5,257,113 | 10/1993 | Chen et al. | 358/426 |
| 5,353,391 | 10/1994 | Cohen et al. | 395/152 |

MEDIA PIPELINE WITH MULTICHANNEL VIDEO PROCESSING AND PLAYBACK

BACKGROUND OF THE INVENTION

Technology for manipulating digital video has progressed to the point where it can be readily processed and handled on computers. For example, the Avid/1 Media Composer, available from Avid Technology, Inc. of Tewksbury, Mass., is a system wherein digital video can be readily captured, edited, and displayed for various purposes, such as broadcast television and film and video program post-production.

The Avid/1 Media Composer uses a media pipeline to provide real-time digital video output on a computer display. This media pipeline 30 is shown in FIG. 1 and is described in more detail in U.S. Pat. No. 5,045,940, issued Sep. 3, 1991. In this media pipeline 30, a permanent storage 40 stores sequences of digital still images which represent digital video and are played back at a rate which provides the appearance of video. The sequences of digital still images do not include any frame synchronization or other type of timing information which are typically found in television signals. The still images also typically are stored in compressed form. The stored sequences are accessed and placed in a data buffer 42 from where they are provided to a compression/decompression system 44. The output of the compression/decompression system 44 is applied to a frame buffer 46 which converts the still image to a typical video signal which is then applied to an input/output unit 48. Each of the systems 40, 42, 44, 46, and 48 in this media pipeline 30 operate bi-directionally. That is, the output process discussed above can be reversed and video signals can be input via input/output unit 48 to the frame buffer 46 where they are converted to a sequence of digital still images. The images in the sequence are compressed by compression/decompression system 44, stored in data buffer 42 and then transferred to the permanent storage 40.

Although the media pipeline provides many advantages for digital video, including enabling broadcast and editing from the stored digital images in a computer system, this media pipeline is not able to provide real-time digital video effects including complex arbitrary three-dimensional effects, simple, two-dimensional effects such as resizing, x-y translation, rotating, layering (an appearance of picture-in-picture), and finally simple effects such as dissolves, wipes, fades and luma and/or chroma keying. In order to perceive such effects on the computer, the effect generally is first generated (not in real time), then digitized and stored if generated on a tape and finally played back.

SUMMARY OF THE INVENTION

The invention improves over the prior art by providing a media pipeline with two channels for processing sequences of digital still images. A blender is provided so as to enable simple effects on these two streams of video data such as dissolves, wipes and chroma keys. Complex arbitrary three-dimensional effects and other effects may also be provided using an external interface.

Thus, a system for processing sequences of digital still images to provide real-time digital video effects includes first and second channels for communicating first and second sequences of digital still images at a rate for simulating video. A controller directs still images to one of the first and second channels. A blender, having a first input connected to the first channel, a second input connected to the second channel, and an output, provides a combination of the first and second sequences of digital still images at a rate for simulating video.

DETAILED DESCRIPTION

The present invention will be more completely understood through the following detailed description which should be read in conjunction with the attached drawing in which similar reference numbers indicate similar structures. All references cited herein, including pending patent applications, are hereby expressly incorporated by reference.

Figure 1:
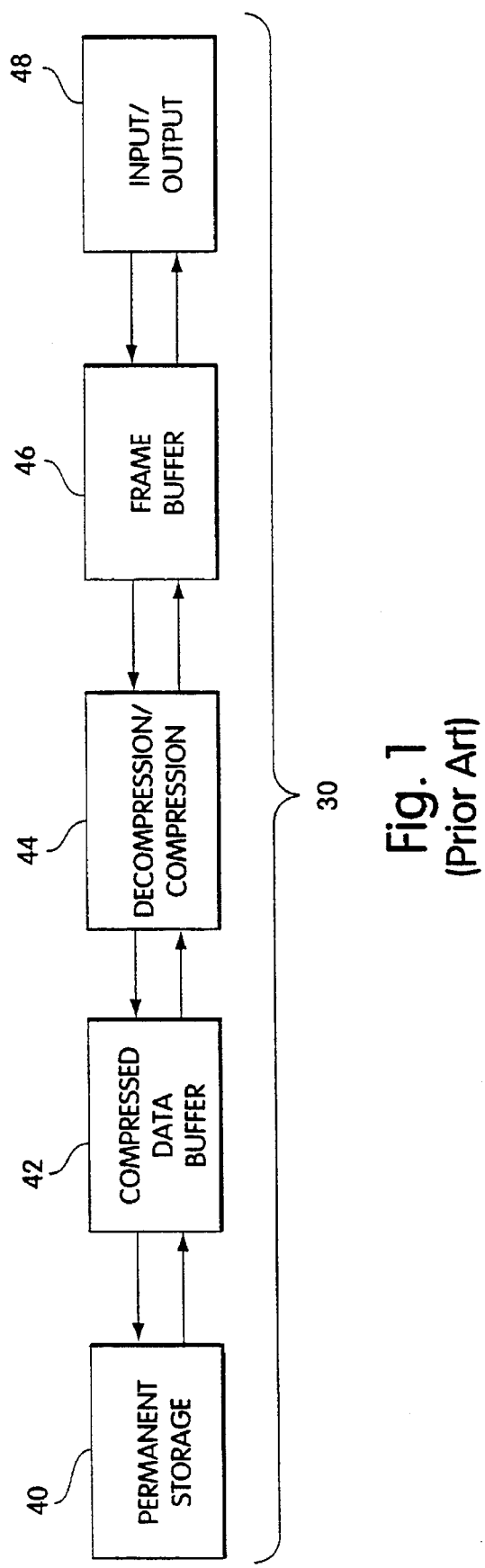
FIG. 1 is a block diagram of a media pipeline as is used in the prior art.
Figure 2:
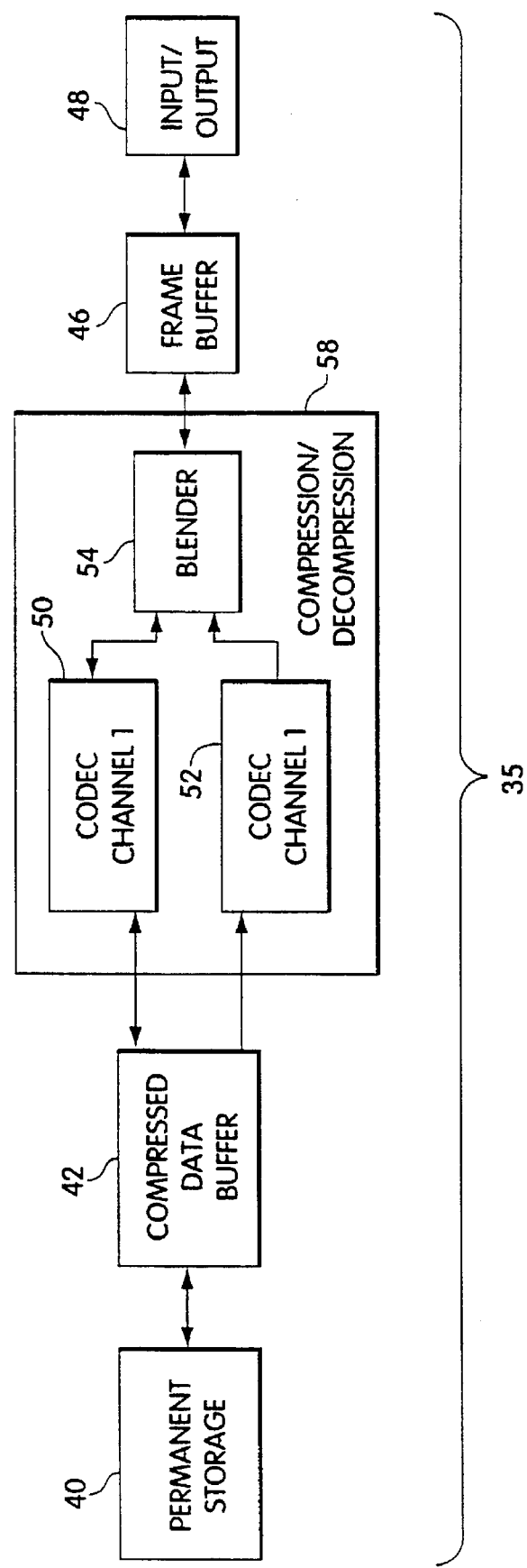
FIG. 2 is a block diagram of a modified media pipeline in accordance with the present invention.

A media pipeline 35 with two channels of digital video for providing effects will now be described in connection with FIG. 2. The media pipeline 30 shown in FIG. 1 is modified to include a compression/decompression (CODEC) unit 58 which is a modification of compression/decompression system 44 of FIG. 1. The CODEC unit 58 has two CODEC channels 50 and 52. One is used for compression and decompression, i.e., for both recording and playback, while the other is used only for playback. The outputs of these channels are fed to a blender 54 which combines them according to the desired effect. It is not necessary to use compressed data; however, compression is preferable to reduce storage requirements. This compression/decompression unit 58 is described in more detail in British provisional specification 9307894.7, filed Apr. 16, 1993, under U.S. foreign filing license 504287 granted Apr. 13, 1993.

Figure 3:
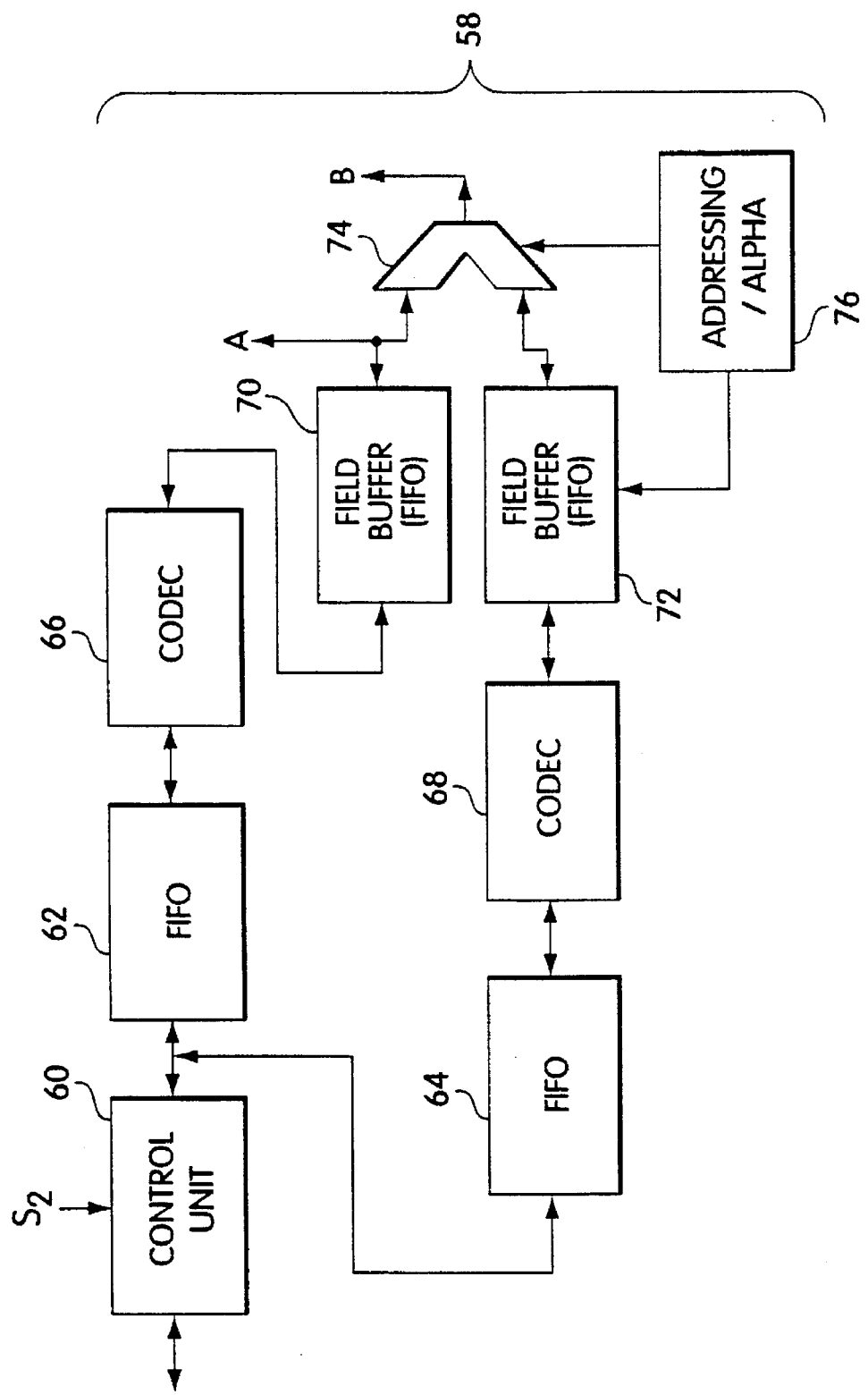
FIG. 3 is a more detailed block diagram of a modified compression/decompression subsystem of the media pipeline in accordance with the present invention.

This CODEC unit 58 will now be described in more detail in connection with FIG. 3. In this figure, a control unit 60 controls two channels of coder/decoders. The modification to the media pipeline 30 is made by assigning, in the control unit 60, different sections of the compressed data buffer 42 to each channel. A sequence of digital still images is also assigned to a channel. Thus, when the sequence is read into the compressed data buffer 42, it is input to the section assigned to the channel for that sequence. Thus, reading and writing of data into the FIFO 62 and 64 for the CODECs 66 and 68 is based on the assignment of a channel to a selected sequence of digital still images.

Each channel has a separate CODEC, either a first CODEC 66 or a second CODEC 68. The CODECs typically use the Joint Photographic Expert Group (JPEG) proposed standard for still image compression. Such CODECs are commercially available, such as the CL550 available from C-Cube of Milpitas, Calif. Each CODEC has a respective first-in, first-out (FIFO) memory elements 62 and 64. The FIFO memory elements 62 and 64 feed respectively to the CODECs 66 and 68 of which the outputs are applied to field buffers 70 and 72, which are also preferably FIFO memory elements. These two channels may be blended using a blender 74 which is controlled by an addressing and alpha information unit 76, as will be described in more detail below. The blender 74 and alpha and addressing information unit 76 are preferably implemented using a field reprogrammable gate array such as the XC3090 manufactured by XiLinx.

Figure 4:
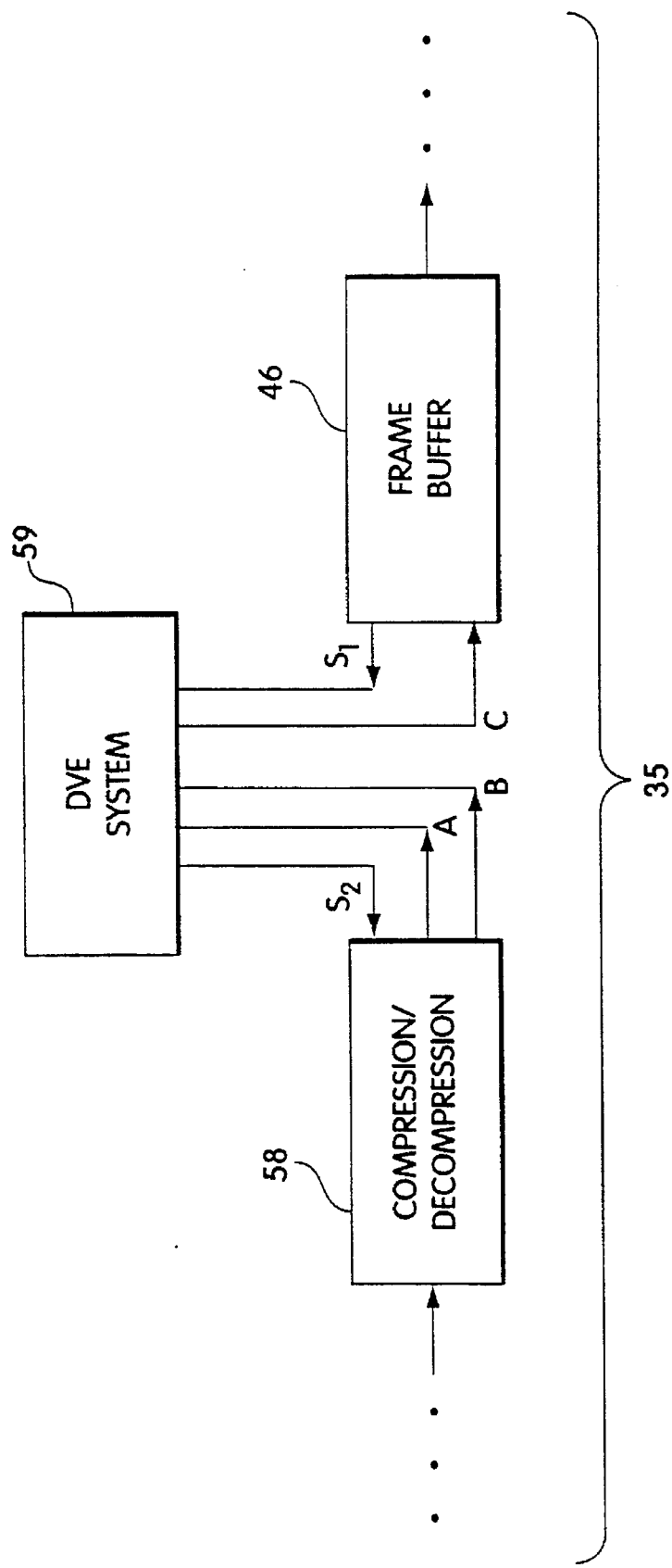
FIG. 4 is a block diagram of a modified media pipeline in accordance with the present invention to provide real time digital video effects.

Alternatively, a first output sequence may be provided by output A from the FIFO 70 for CODEC 66, and a second output sequence may then be provided by the output of the blender, when no blending is performed, as the output B. Thus, FIFO 70 and blender 74 act as first and second sources of sequences of digital still images. The outputs A and B may be applied to a digital video effects system 59 as shown in FIG. 4. This embodiment is useful for providing arbitrary three-dimensional video effects, as are described in U.S. patent application entitled Media Pipeline with Mechanism for Real-Time Addition of Digital Video Effects filed Mar. 18, 1994 by Harry Der et al., and assigned to Avid Technology, Inc. of Tewksbury, Mass.

More complex, two-dimensional effects can also be made using techniques known in the art, including X-Y translation, rotation and scaling. An additional effects board, similar to that for the three-dimensional, arbitrary effects, can be provided so as to perform an operation on a single stream. To provide this operation, the output A as shown in FIG. 4 is applied to such an effects generator, the output of which would be applied to the input of the blender originally designed to receive channel A. When this capability is provided, the digital effects typically produce an output using the YUV data format with four bits for each of the Y, U and V parameters (4:4:4). In contrast, the normal data format for channels A and B is 4:2:2. Thus, in this instance, the blender 76 should be designed so as to optionally process channel A for either 4:4:4 format or 4:2:2 format, according to whether such digital effects are being provided.

Provision of simpler video effects in real time, such as box wipes and chroma and luma keys, using blender 74 and alpha and addressing information 76, will now be described. Blending of two streams (A and B) of video typically involves the application of the function $\alpha A + (1-\alpha)B$ to the streams of video information, where $\alpha$ is a value which can vary from pixel to pixel in an image, and where A and B, at any given point in time, are pixels in corresponding frames in the two streams (A and B) of video. Each effect is thus applied to one frame from each of the two streams. (One normally does not perform an effect on only a fraction of a frame). Given $\alpha$, at any point in time and the addresses for pixels A and B, the output image can be generated. The blender 74 which performs this operation be determining the result of the combination $\alpha A + (1-\alpha)B$ can be implemented using standard digital hardware design techniques. Preferably, a field reprogrammable gate array is used to implement the function $(A-B)\alpha + B$.

The value of $\alpha$ applied to two pixels is dependent upon the kind of effect to be provided. For example, dissolves uses the same $\alpha$ for for all pixels in one frame. $\alpha$ is gradually decreased for subsequent frames in the dissolve. The pair of pixels to be combined is also dependent upon the kind of effect to be provided. The indication of which pair of pixels to use is called the addressing information. For each kind of effect to be provided, a state machine and state variables can be defined for processing one frame of output video. The two general types of effects are chroma and/or luma keys and box wipes, which include dissolves and fades.

For example, in order to implement chroma and/or luma keying, two threshold values D1 and D2 and a key point Kc are defined by the user for each parameter of a pixel. These effects are typically applied to the YUV representation of an image. Thus, an incoming image is processed by comparing the pixel Y, U and V values to the key points and threshold values defined for Y, U, and V. In particular, using the parameter U as an example, $\|Kc-U\|$ is calculated. If this value is less than D1, $\alpha$ is set to be the maximum possible value. If this value is greater than D2, $\alpha$ is set to be the minimum possible value. When the value is somewhere between D1 and D2, a value for $\alpha$ is determined according to this value. In one embodiment of the invention, D1–D2 is required to be some fixed number, e.g., 16. The magnitude of this fixed number represents the desired number of $\alpha$. In this embodiment, when the value of $\|Kc-U\|$ is between D1 and D2, the value $\|Kc-U\|$-D1 is applied to a lookup table (stored in a random access, preferably rewritable, memory), which stores corresponding values of $\alpha$ to be used. The values of $\alpha$ may be any function of the input $\|Kc-U\|$-D1, such as a step function, a sigmoid function, a ramp or any function desired by a user. Typically, only Y or U,V are keyed and processed. One could apply keying to all of Y, U and V at once, and combine the resulting $\alpha$ values, for example, by using the function ($\frac{1}{2}(\alpha_u + \alpha_v)$ AND $\alpha_y$).

Box wipes with a border can also be provided. A box wipe is a transition between two streams defined by a rectangular shape. Within the rectangle, information from one channel is provided. Outside the rectangle, information from the other channel is provided. The transition region can be strictly defined by the border of the rectangle or a border color can be provided. The transition can be described as a linear ramp (defined by a ratio of the channels to each other). The transition is thus defined by the lower and upper limits of the ramp, the step size, and the duration. All of these parameters should be user definable. Also, the coordinates of the box should be programmable to provide a horizontal wipe, a vertical wipe, or some corner to corner wipe. Typically, a blend is performed from the first channel to the border, from the border to the next channel, or among both channels. A state machine can readily be defined according to the variables defining the wipe so as to provide an output $\alpha$ value for each pair of pixels to be combined. There are three values used to define the final $\alpha$. The $\alpha_{init}$ values define the initial $\alpha_X$ and $\alpha_Y$ values, where $\alpha_X$ and $\alpha_Y$ are accumulated values according to the state machine. In the simplest wipe, a dissolve, the initial values are held, i.e., not changed, throughout a whole frame. In the other box wipes, $\alpha_X$ and $\alpha_Y$ may change, according to the desired wipe. In this process, the final $\alpha$ value is typically taken to be $\alpha_X$, subject to a limiting function defined by $\alpha_Y$. That is, the final $\alpha$ typically is $\alpha_X$ when $\alpha_X$ is less than $\alpha_Y$ and typically is $\alpha_Y$ when $\alpha_X$ is greater than $\alpha_Y$.

A wipe is defined by two sets of parameters. The first set is parameters for the X direction in a frame; the second set is parameters for the Y direction, defining changes between scan lines in the effect. Both of the X and Y parameters include four groups of four parameters, each group representing an operation, including offset, control, interval, and delta information. The offset information defines where blending is to begin. In the X direction, it identifies the pixel in the scan line where the first blend begins. In the Y direction, it identifies the scan line where blending is to begin. The next information is control information identifying whether further operations in the scan line, or in the frame will follow. For the X parameter, this control information is represented by two bits, wherein the first bit represents whether video is swapped between the A and B channels. The other bit indicates whether another operation in the X direction will appear. After the control information is the interval over which the blend is to be performed. The interval either identifies the number of scan lines or a number of pixels within one scan line. Finally, the delta information represents an increment to be added to $\alpha_X$ or $\alpha_Y$ for each pixel over the defined interval. Thus, a wipe is defined by four groups of four operations in each of the X and Y directions. The first operation signifies the transition from channel A to the border; the second from the border to the second channel; the third from the second channel to the border; and the fourth from the border to the first channel. If there is no border, only two operations are used and the second operation indicates that there is no further operation to be performed either for the scan line or for the frame.

Given the operations defining the wipe to be performed, including the four groups of operational information for each of the X and Y parameters, a state machine can be used to determine $\alpha$ for each pixel in the frame. These state machines will now be described in connection with FIGS. 5 through 8.

Figure 5:
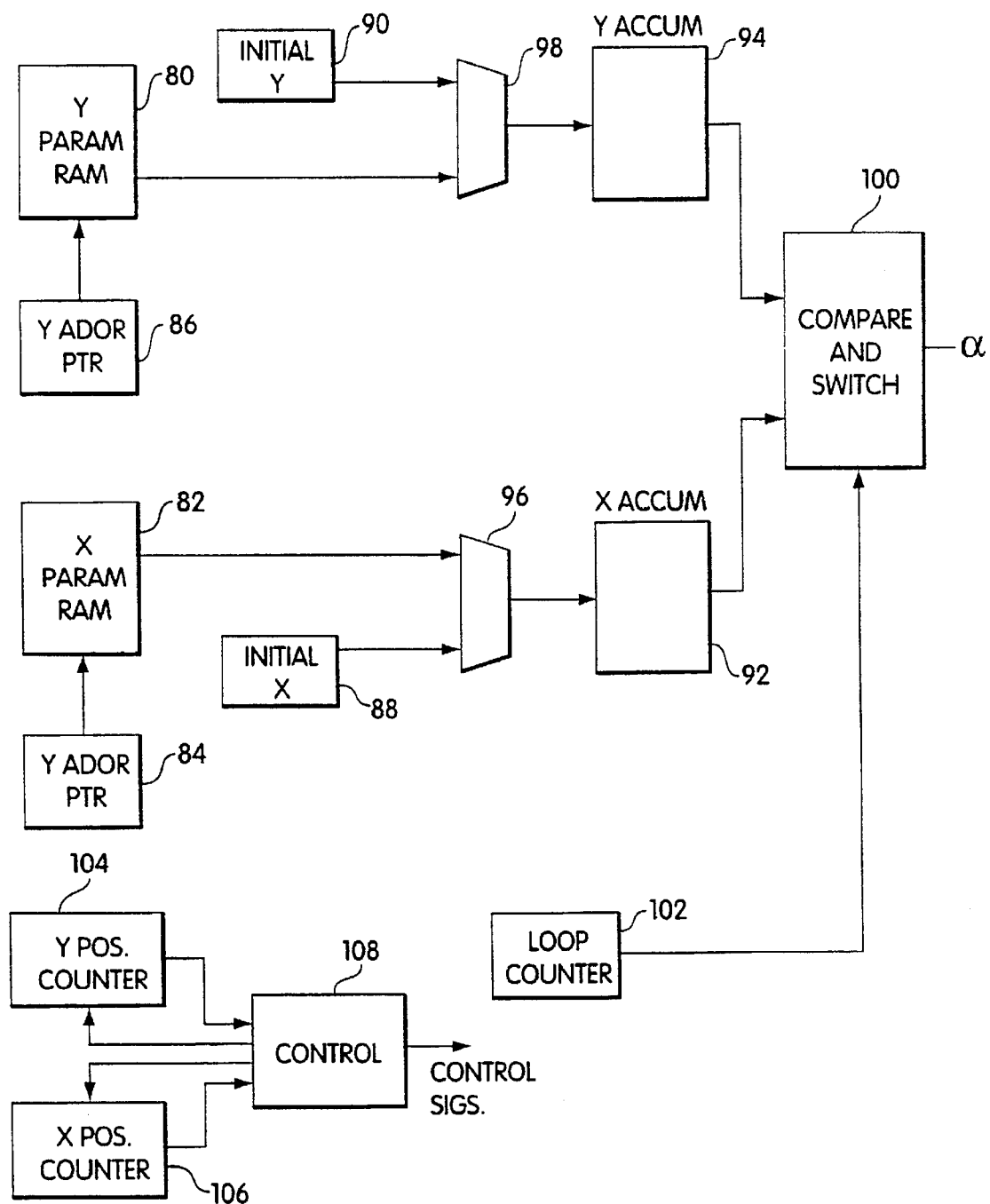
FIG. 5 is a block diagram of the $\alpha$ generator for box wipes.

FIG. 5 is a block diagram illustrating some structures controlled by a state machine. The state machine's operation will be described in connection with the flow charts of FIGS. 6 and 7. In FIG. 5, X parameter memory 82 and Y parameter memory 80 store the operations to be performed. An address pointer is stored in registers 84 and 86 for each of these memories as X and Y address pointers. Initial X and Y delta values are also stored in registers 88 and 90. These are fed to accumulators for the X and Y values 92 and 94 via switches 96 and 98. The output of the accumulators 94 and 92 are fed to compare and switch unit 100, the output of which provides the $\alpha$ value in a manner to be described below in connection with FIG. 8. There is also a loop counter 102 which indicates the part of frame on which the effect is being performed. The significance of this will also be discussed further below in connection with FIG. 8. There is also a Y position counter 104 and an X position counter 106 which are used by the control 108 which operates in accordance with the flow charts of FIGS. 6 and 7.

Figure 6:
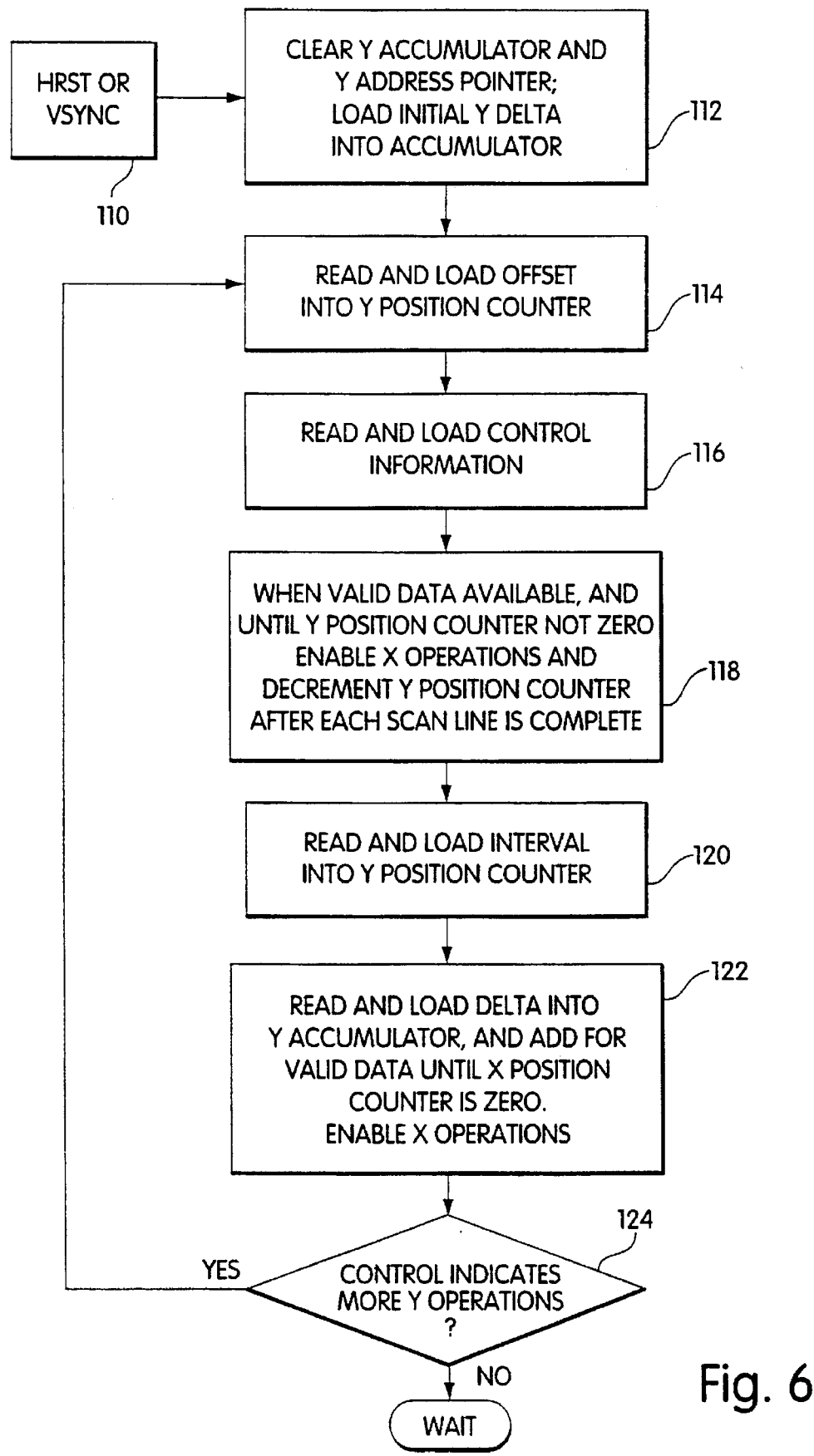
FIG. 6 is a flow chart describing the operation of a state machine for each scan line in a frame for a box wipe.
Figure 7:
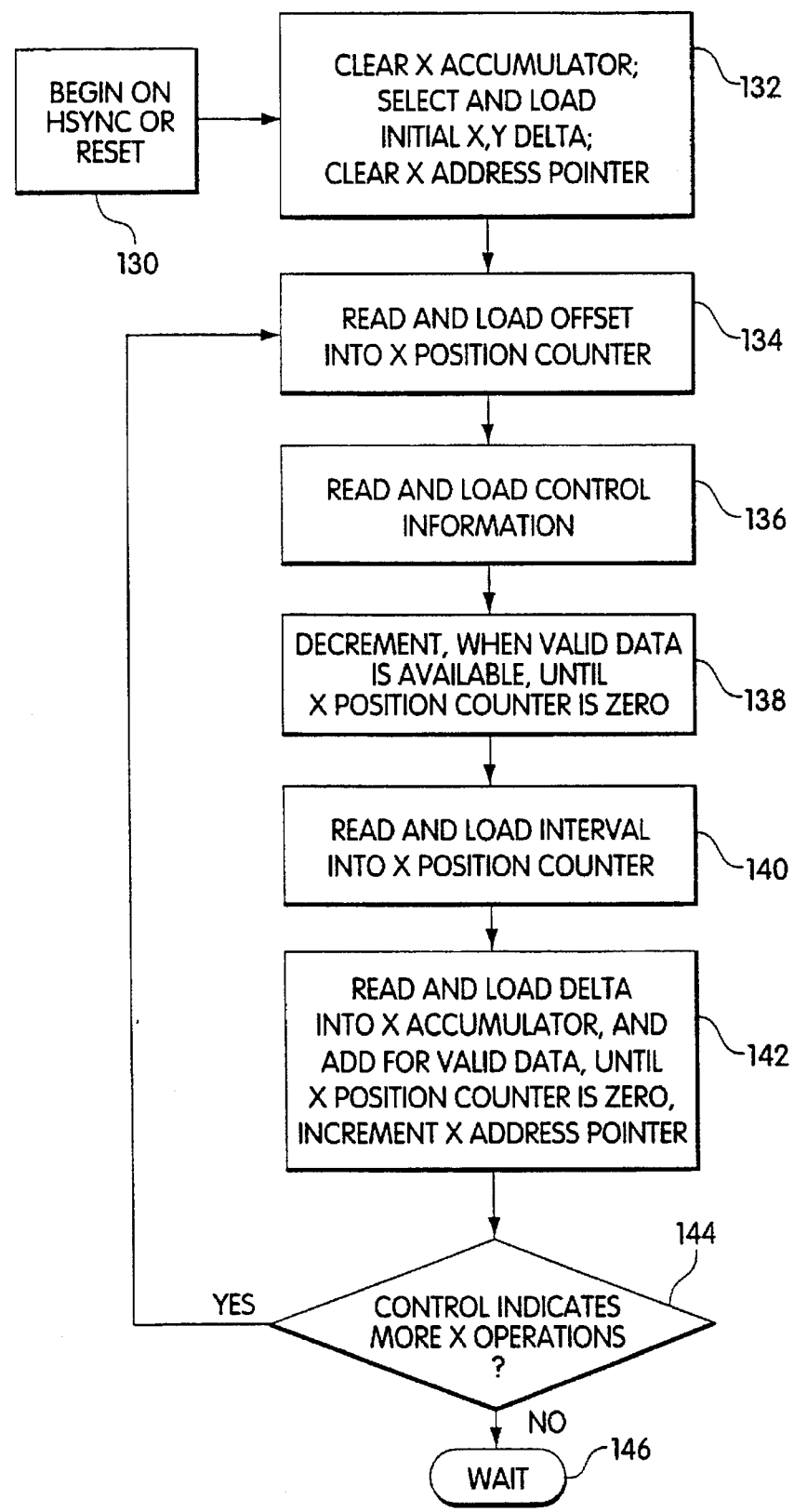
FIG. 7 is a flow chart describing the operation of a state machine for each pixel in a scan line for a box wipe.

FIGS. 6 and 7 will now be described.

Upon a horizontal reset (HRST) or vertical sync (VSYNC), as indicated at step 110, the Y accumulator 94 and Y address pointer 86 are cleared. An initial Y delta value 90 is loaded then into the accumulator 94 via switch 98 (step 112). An offset is then read from the Y parameter memory 80 into the Y position counter 104 (step 114). Control information is then read from the Y parameter memory 80 into the loop counter 102 (step 116).

When valid data is available to be processed, and until the Y position counter 104 is not zero, operations on a scan line are performed in step 118 as will be discussed below in connection with FIG. 7. After each scan is processed, the Y position counter 104 is decremented. When the Y position counter reaches zero, the interval is read and loaded from parameter memory 80 into the Y position counter 104 (step 120). A delta value is then read from the Y parameter memory 80 into the Y accumulator 94 and is added to the current value therein (step 122). This value is added for each scan line until the Y position counter is then zero. Each scan line is processed in accordance with the steps described below in connection with FIG. 7. When the Y position counter 104 is zero, the control information is examined in step 124 to determine if further Y operations are to be performed. If there are further operations to be performed, processing returns to step 114. Otherwise, the system waits until another horizontal reset or vertical sync occurs.

Operations on one scan line will now be described in connection with FIG. 7. These operations begin in step 130 upon the receipt of a horizontal sync or reset. In step 132, the X accumulator 92 and X address pointer 84 are cleared and an initial delta value at 88 is then loaded into the X accumulator 92 via switch 96. An offset is then loaded from the X parameter memory 82 in step 134 into the X position counter 106. Next control information is read from the X parameter memory 82 into loop counter 102 in step 136. The X position counter is decremented when valid data is available, until the X position counter 106 is zero (step 138). The interval is then read from X parameter memory 82 into X position counter 106 in step 140. The delta value is then read from X parameter memory 82 into the X accumulator 92 and is added to the current value in the accumulator 92 until the X position counter is zero (step 142). The X address pointer and Y address pointer are incremented along this process to identify the correct operation. If the control information indicates that more X operations are to be performed, as determined in step 144, processing returns to step 134. Otherwise, the system waits in step 146 until another horizontal sync or reset occurs.

For each pixel in the scan line, as indicated by each decrement operation on the X position counter 106, an $\alpha$ value is output from the compare and switch unit 100. How this operation is provided was discussed above. Further details for more complicated box wipes in this selection will now be provided in connection with FIG. 8.

As indicated in FIG. 5, the compare and switch unit 100 receives an $\alpha_Y$ value from the Y accumulator 94 and $\alpha_X$ value from X accumulator 92 and a loop counter 102. The loop counter indicates which quadrant in a box wipe with a border is being processed. The indication of a quadrant can readily be determined by the status of the state machine and a counter. Because the X operations and Y operations are each defined by four groups of four parameters, wherein each group identifies an operation to be performed when a portion of an image, there are precisely sixteen combinations of X parameters and Y parameters, each identifying a quadrant of the resulting image. The $\alpha$ value for each quadrant has a predetermined relationship with the $\alpha_X$ and $\alpha_Y$ values. Thus, according to the loop control 102, the appropriate selection among $\alpha_X$ and $\alpha_Y$ can be provided.

The relationships of $\alpha$ to $\alpha_X$ and $\alpha_Y$ for each quadrant will now be described in connection with FIG. 8.

Figure 8:
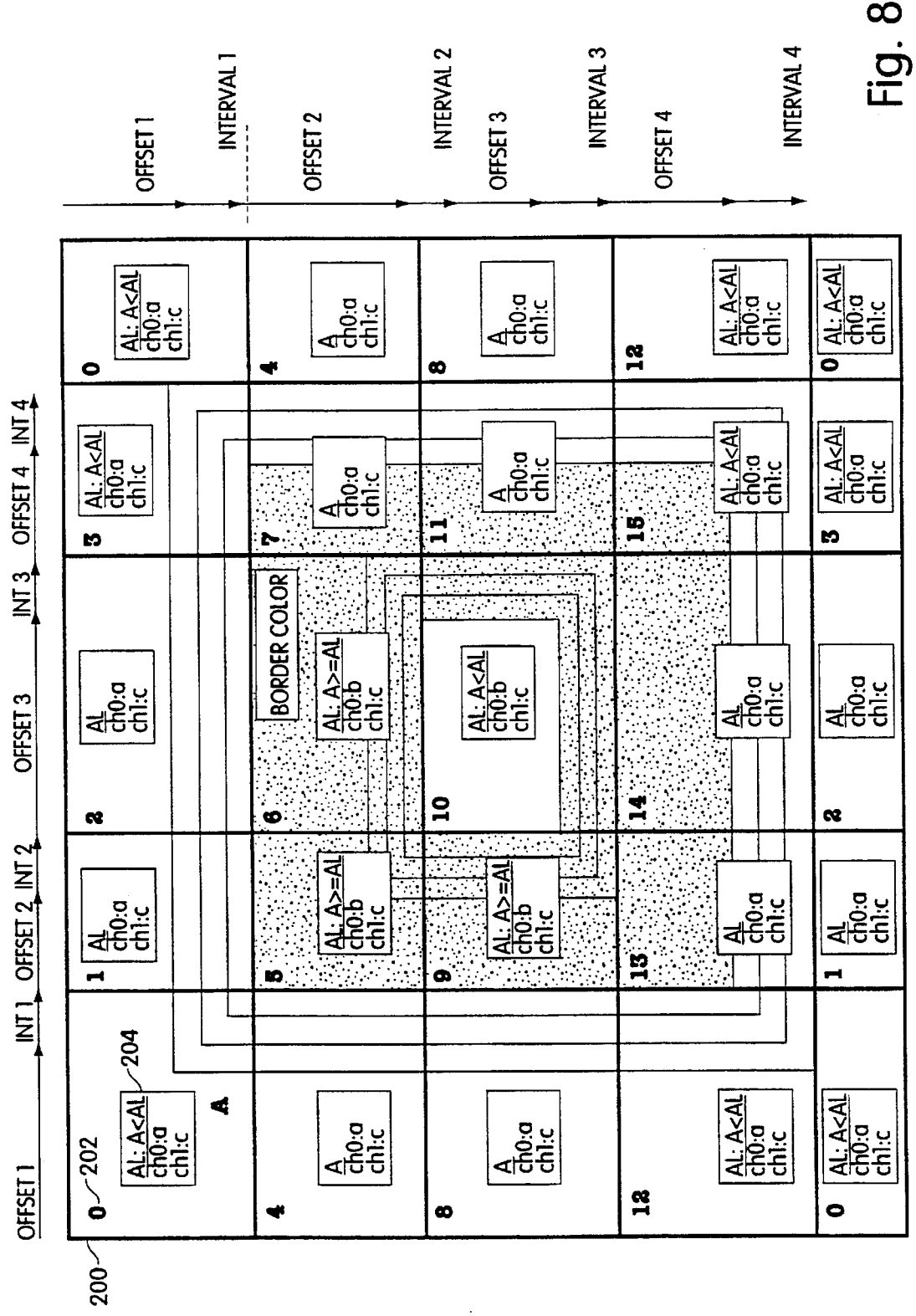
FIG. 8 is a diagram showing how $\alpha$ is determined for different regions of an image for a box wipe.

FIG. 8 illustrates 25 regions of a box wipe with a border and transitions between one image, a border color, and another image. There are fifteen general types of regions to be considered in this effect, each being numbered accordingly in the upper left hand corner of the box. For example, the first region 200 is labelled zero as indicated at 202. A box 204 is shown in each region identifying the source of image data (where CH0 corresponds to the channel applied to input A of the blender 76 and CH1 corresponds to the input applied to input B of the blender). The first line in box 204 indicates the $\alpha$ value to be provided to the blender. "A" indicates that $\alpha_X$ is supplied as $\alpha$, as in regions 4, 7, 8 and 11. "AL" indicates that $\alpha_Y$ is supplied as the $\alpha$ value, as in regions 1, 2, 13 and 14. "AL:A<AL" indicates that $\alpha_X$ is provided when it is less than $\alpha_Y$ and $\alpha_Y$ is provided otherwise, as in regions 0, 3, 10, 12 and 15. "AL:A>=AL" indicates that $\alpha_Y$ is provided unless $\alpha_X$ is greater than $\alpha_Y$ when $\alpha_X$ is provided, as in regions 5, 6, and 9.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A circuit for processing first and second sequences of digital still images defining motion video to provide digital video effects, using a video encoder having an input for receiving digital video information defining digital still images and an output providing a motion video signal according to the digital still images and having a frequency and synchronization signals associated with the frequency and the size of an image represented by the motion video signal and an output indicating a demand for data when data can be received by the input, the circuit comprising:

a first buffer for receiving, storing and communicating digital video information defining pixels of the first sequence of digital still images;

a second buffer for receiving, storing and communicating digital video information defining pixels of the second sequence of digital still images;

a first controller for receiving and directing digital video information defining the first and second sequences of digital still images to one of the first and second buffers respectively, and for maintaining valid data in the first and second buffers to allow reading of data from the first and second buffers;

a blender having a first input connected to the first buffer, a second input connected to the second buffer and an output providing digital video information defining pixels of a combination of pixels in the first and second sequences of digital still images; and a second controller having an input connected to receive the output from the video encoder indicating demands for data and for reading digital information from the first and second buffers into the first and second inputs of the blender according to availability of valid data in the first and second buffers and demands for data from the video encoder.

2. The circuit of claim 1, further comprising a frame buffer having an input connected to the output of the blender and an output connected to the input of the video encoder to communicate the digital video information output by the blender to the video encoder.

3. The circuit of claim 1, wherein each of the first and second buffers is a first-in, first-out memory circuit.

4. The circuit of claim 1, wherein each of the first and second buffers comprises an input for receiving compressed digital still images into a first buffer memory, a decompression circuit having an input for receiving the compressed digital still images and an output providing decompressed digital still images to a second buffer memory, wherein the second buffer memory communicates the decompressed digital still images to the blender.

5. The circuit of claim 4, wherein the decompression circuit is a circuit which receives and decompresses images compressed according to JPEG standard.

6. The circuit of claim 1, wherein the first buffer is connected to a first input of a digital video effects system and the output of the blender is connected to a second input of the digital video effects system and the output of the digital video effects system is connected to a frame buffer, wherein the blender is programmable so as to communicate the sequence of digital still images of the second buffer to the output of the blender without blending with the sequence of digital still images of the first buffer.

7. The circuit of claim 1, wherein the controller in the blender comprises an addressing and alpha information unit which receives an indication of an effect to be performed and provides a value $\alpha$ to the blender for each pair of pixels to be blended according to the indicated effect wherein the blender performs a blending function on a first pixel A from the first channel and a second pixel B from the second channel such that the output of the blender is $\alpha A+(1-\alpha)B$.

8. A method for blending first and second sequences of digital still images without timing signals and defining motion video to create a third sequence of digital still images without timing signals and defining motion video, comprising the steps of:

periodically transferring pixel data of images from the first and second sequences into first and second buffer circuits to maintain valid data in the first and second buffer circuits according to demand for the pixel data;

receiving an indication of a blend operation to be performed on the images;

sequentially reading corresponding pairs of pixels of each of the images from the first and second sequences from the first and second buffer circuits according to availability of valid data in the first and second buffer circuits and demand for the pixel data in the third sequence of digital still images;

selecting a blending factor according to the indicated blend operation and a relative position of a combination of the selected pixels in the desired output image; and blending the selected pixels according to the selected factor to generate pixels in the image of the third sequence desired output.

9. The circuit of claim 1, wherein the first controller transfers pixels to the first and second buffers so as to align pixels to be combined by the blender.

10. The circuit of claim 1, wherein the second controller includes means for addressing the first and second buffers according to scanlines and whether valid data is available.

11. The circuit of claim 1, wherein the second controller further controls operation of the blender according to user input to generate each frame of an output sequence at user-selectable times.

12. The circuit of claim 11, wherein the second controller includes means for temporarily pausing operation of the blender.

13. The method of claim 8, wherein the step of transferring includes transferring pixels to the buffer circuits so as to align pixels to be combined in the step of blending.

14. The method of claim 8, wherein the step of blending includes addressing the first and second buffers according to scanlines and whether valid data is available.

15. The circuit of claim 8, further comprising the step of controlling the step of blending according to user input to generate each frame of an output sequence at user-selectable times.

16. The circuit of claim 15, wherein the step of controlling includes the step of temporarily pausing the step of blending.

* * * * *